Patented Nov. 21, 1944

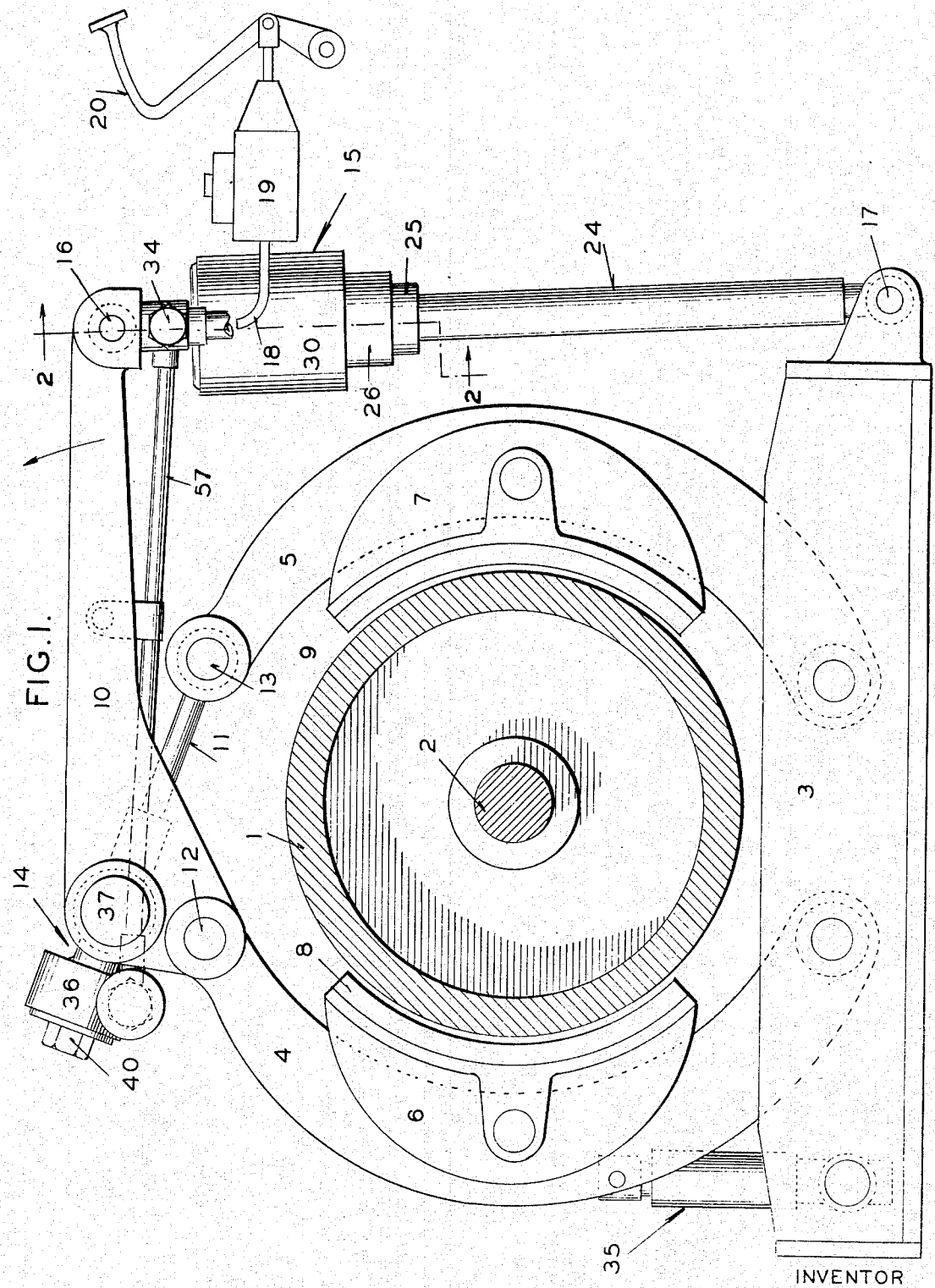

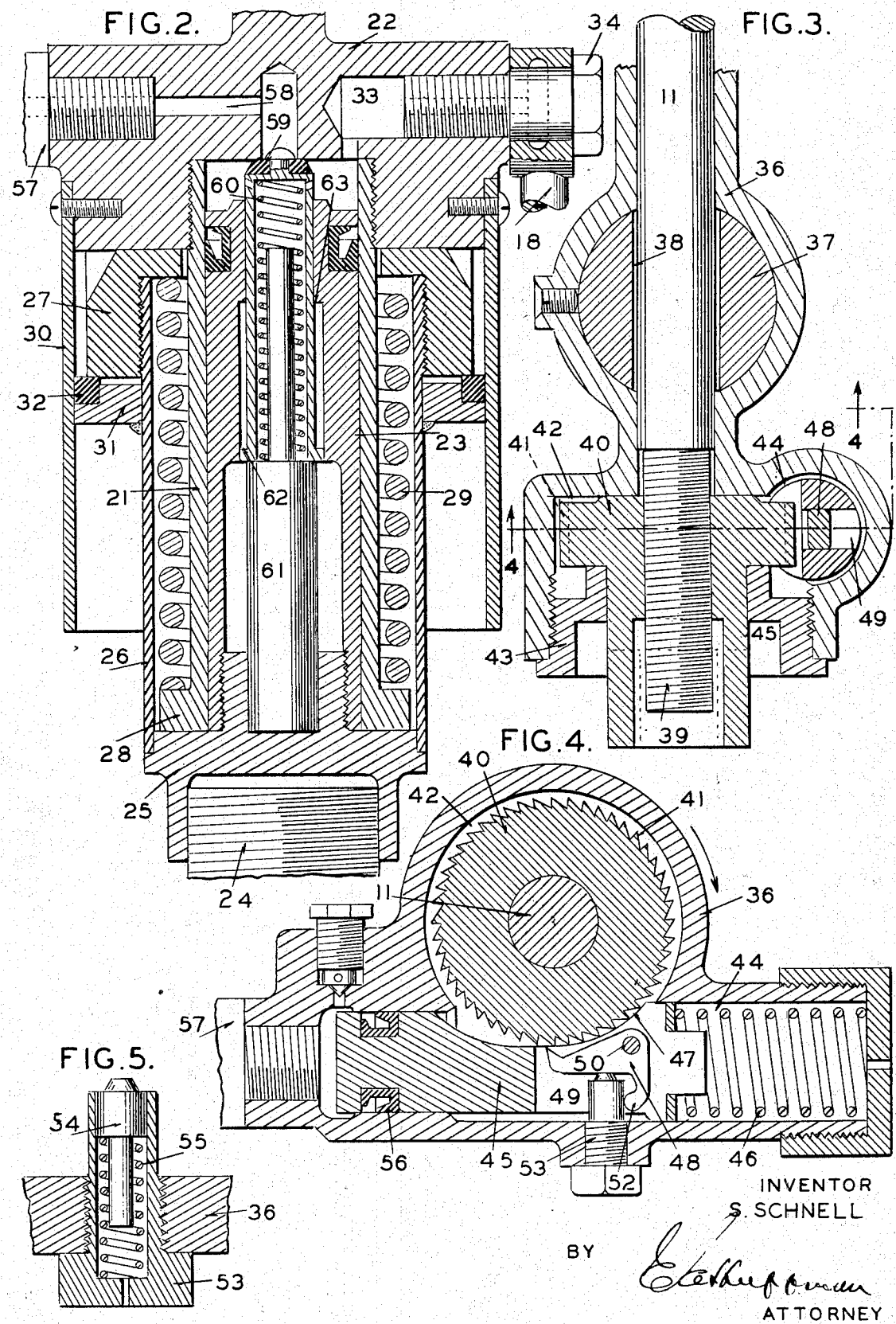

2,363,152

UNITED STATES PATENT OFFICE 2,363,152

AUTOMATIC BRAKE ADJUSTING MEANS

Steve Schnell, Kirkwood, Mo., assignor to Wagner Electric Corporation, St. Louis, Mo., a corporation of Delaware Application June 23, 1943, Serial No. 491,916

5 Claims. (Cl. 188—79.5)

My invention relates to brakes and more particularly to means for adjusting the actuating means of a brake to compensate for wear of the friction element or elements.

One of the objects of my invention is to provide a fluid pressure actuated brake with automatically operable means for making an adjustment to compensate for brake shoe lining wear.

Another object of my invention is to provide an adjusting means for a brake which will be operable by fluid pressure derived from the fluid pressure actuating system for the brake.

Yet another object of my invention is to provide a brake adjusting means which will be operated to compensate for lining wear when the relatively movable elements of the fluid pressure actuating means for the brake are moved beyond predetermined relative positions.

A more specific object of my invention is to provide in a brake, improved adjusting means for a mechanical actuating linkage operated by a fluid pressure motor.

Other objects of my invention will become apparent from the following description taken in connection with the accompanying drawings in which Figure 1 is a view of a brake and actuating means therefor having an adjusting means embodying my invention associated therewith; Figure 2 is a sectional view taken on the line 2—2 of Figure 1, showing the parts of the actuating fluid motor; Figure 3 is a longitudinal sectional view of the adjusting means for the actuating linkage; Figure 4 is a sectional view taken on the line 4—4 of Figure 3; and Figure 5 is an enlarged sectional view of the biasing plunger for the pawl.

Referring to the drawings in detail, I have disclosed, by way of example, a brake employed for industrial purposes, such as one used on a crane and having an automatic adjusting means embodying my invention associated therewith. In the particular brake shown the adjusting means is employed to take up slack in a mechanical mechanism for actuating the brake shoes but it is to be understood that it may be used wherever it is desired to make an adjustment to compensate for wear of the brake friction means. As seen in Figure 1, the brake comprises a drum 1 secured to a shaft 2. Beneath the drum is a base 3 which has pivoted thereto two levers 4 and 5 carrying brake shoes 6 and 7, respectively, provided with linings 8 and 9. The upper ends of levers 4 and 5 are adapted to be actuated by an L-shaped lever 10 and a link 11. The toe end of lever 10 is pivoted to the end of brake lever 4 by a pin 12. One end of link 11 is pivoted by means of a pin 13 to the brake lever 5 and the other end of this link is adapted to be pivoted to the heel end of lever 10 by an adjustable connection generally indicated by the numeral 14 which is adapted to be automatically operated in accordance with my invention. The outer end of the L-shaped lever 10 is actuated by a fluid motor generally indicated by the reference 15 which has one of its relatively movable elements pivoted to the lever by a pin 16 and the other of its relatively movable elements pivotally connected to the base by a pin 17. A conduit 18 leads from the fluid motor to a suitable source of pressure shown as a master cylinder device 19 manually operated by a pedal 20.

As shown in detail in Figure 2, the fluid motor consists of a cylinder 21 closed at one end by a cap member 22 which is pivoted to the L-shaped lever 10 by the previously referred to pin 16. Within the cylinder is a piston 23 which is connected to a rod 24 by a connector 25, said rod 24 being connected to the base of the brake by the previously referred to pin 17. Connector 25 carries a tubular shell 26 extending upwardly therefrom and surrounding cylinder 21. The upper end of this shell carries a ring 27 and interposed between this ring and a flange 28 on the lower end of cylinder 21 is a coil spring 29 lying between shell 26 and cylinder 21. This spring normally holds the piston and cylinder in their retracted or inoperative positions and also acts to retract the brake shoes from the drum when the shoes are permitted to be retracted by release of fluid pressure. The cap 22 carries a downwardly extending projecting shell 30 which surrounds shell 26. In order that dirt and other foreign matter may be excluded from the interior of shell 26, said shell carries a ring 31 provided with a packing 32 cooperating with the inner surface of shell 30. Cylinder 21 is connected to communicate with conduit 18 coming from the master cylinder device by means of a passage 33 in cap 22, which passage receives the conduit connecting bolt 34.

From the structure just described it is apparent that when fluid under pressure is developed by the master cylinder device and forced into the upper end of cylinder 21, cap 22 and lever 10 will be forced upwardly in the direction of the arrow of Figure 1 and thereby cause the brake shoes to be applied to the drum. The movement of cap 22 and cylinder 21 upwardly compresses the retracting spring 29. Thus when the fluid pressure is released, this spring will be effective to return the parts to the positions shown in Figure 2, thereby returning the brake shoes to retracted positions.

In order that the brake shoes, when retracted, will not drag on the drum, lever 4 has associated therewith an adjusting mechanism generally indicated by the numeral 35 (Figure 1) and interposed between the base and the brake lever 4. This adjusting mechanism operates to provide an adjustable stop to maintain a predetermined "off" position for the brake shoe 6 as the lining wears. Thus when the brake shoes are retracted from the drum, lever 4 will assume a predetermined position and can then act as a fulcrum to insure that shoe 7 will be held off the drum. Details of the adjusting mechanism 35 form no part of my invention and, therefore, need not be described in detail.

As linings 8 and 9 of the brake shoes wear, slack will develop in the actuating mechanism and it will be necessary for lever 10 to be moved through a greater arc in order to apply the brake. To make this additional movement of lever 10, it is necessary that a greater volume of fluid be forced into cylinder 21 by the master cylinder device. In accordance with my invention I provide improved adjusting means which will prevent slack from developing. Thus pedal travel will be conserved and there will always be sufficient volume of fluid displaceable by the master cylinder device to apply the brakes. By my invention automatic adjustment is provided between link 11 and lever 10 which is so controlled that the brakes can always be applied by predetermined movement of lever 10 notwithstanding wear of the linings of the brake shoes.

As best shown in Figures 3, 4, and 5, link 11 is slidably received within a housing 36 which is pivoted to the heel end of lever 10 by a pivot pin 37, said pin being provided with a cross-bore 38 through which link 11 passes. The outer end of link 11 is provided with threads 39 on which is mounted a threaded wheel 40 having peripheral teeth 41. The wheel is received in a chamber 42 in casing 36, said chamber being closed by an annular plug 43. When the wheel is rotated on link 11 in a clockwise direction, as viewed in Figure 4, the link will be moved relatively to lever 10 and the distance between pivot pin 13 and pivot pin 37 will be shortened. This will bring the shoe carrying levers 4 and 5 closer together and compensate for wear of the brake linings.

The housing 36 is also formed to provide a bore 44 intersecting the lower part of chamber 42 so that its axis will be at right angles to the axis of wheel 40. Within this bore is a plunger 45 having a curved cut away portion in order to receive a portion of wheel 40. The cut away portion is of such length as to permit limited reciprocation of the plunger. The plunger is biased by a spring 46 so that a surface 47 formed by the cut away portion engages the teeth of the wheel to hold the wheel in adjusted position. The plunger carries a pawl 48 mounted in a slot 49 by means of a pivot pin 50. This pawl is adapted to cooperate with teeth 41 of the wheel and is provided with a tail portion 52 for engagement with the inner end of a bolt 53 carried by casing 36 and extending into bore 44 and received in slot 49 of the plunger. This bolt is so positioned that when the plunger is biased to the position where surface 47 engages the teeth of the wheel, the pawl will be forced to a position where it is out of engagement with the teeth. As shown in detail in Figure 5, bolt 53 is hollow and carries a plunger 54 backed by a light spring 55. This plunger 54 acts on the pawl to bias it into engagement with the teeth of the wheel when not prevented therefrom by the action of the stronger spring 46.

The end of plunger 45 opposite that acted upon by spring 46 is sealed by a packing element 56 to provide a piston. The end of the bore forward of the plunger is connected to a conduit 57 which has its other end connected to a passage 58 in the cap 22 carrying cylinder 21 forming part of the fluid motor for actuating lever 10. This passage 58 enters cylinder 21 in alignment with the cylinder axis and is adapted to be closed by a valve element 59 carried by piston 23. This valve element is biased to closed position by a spring 60 interposed between a pin 61 and the valve element. The spring normally acts to retain the valve element seated and passage 58 closed as cap 22 moves away from piston 23 when fluid pressure is forced into cylinder 21. The extent of follow-up of the valve element with the cap to maintain passage 58 closed is limited, however, by the valve element being provided with a flange 62 for engagement with a shoulder 63. Thus it is seen that when the flange engages the shoulder, spring 60 can no longer cause the valve element to continue to be held seated and passage 58 will be opened.

Referring to the operation of my novel adjusting mechanism, fluid pressure from the master cylinder device will become effective on the end of plunger 45 whenever lever 10 is moved through such an angle that valve element 59 will open passage 58. When fluid pressure acts on plunger 45, it will be moved to the right, as viewed in Figure 4, thereby compressing spring 46 and moving the pawl to such position that plunger 54 can be operative thereon to engage said pawl with a tooth of wheel 40. When the fluid pressure for actuating lever 10 is released, the fluid pressure acting on plunger 45 will also be released due to one-way action of valve element 59 and spring 46 will operate to move plunger 45 to the left as viewed in Figure 4. This movement of the plunger will cause rotation of wheel 40 in the direction of the arrow and thereby make an adjustment of link 11. When the plunger is returned to its position where surface 47 engages the teeth, tail 52 of the pawl will have engaged bolt 53, thereby forcing the pawl out of engagement with the tooth. With surface 47 engaging the teeth, it will act as a brake and prevent any movement of wheel 40 to alter the adjustment. An adjustment will only take place whenever passage 58 is caused to be opened by valve element 59 not being able to follow cap 22. This occurs only when there has been such brake lining wear as to cause lever 10 to be moved through a greater angle than that necessary to apply the brakes prior to the lining wear.

When the adjusting mechanism and brake are originally assembled, it is not necessary to make any definite adjustment of link 11 as this adjustment will take place automatically by application and release of the brake shoes. Adjustment will continue for each brake application and release until the relative movement of piston 23 and cylinder 21 is insufficient to cause opening of passage 58. From then on there will be no adjustment until sufficient lining wear takes place to result in passage 58 being again opened.

The amount of adjustment for each reciprocation of plunger 45 is quite small as the movement of the plunger is limited by the cut-out portion in order to pick up the teeth successively. It is also to be noted that the arrangement of the spring-biased plunger 54, for controlling the engagement of the pawl, is so associated with the pawl that it acts with less force at the time the pawl is disengaged from the tooth than during the time the pawl is in engagement with the tooth. The line of action of the force of plunger 54 is close to the pivotal axis of the pawl at the time the tail 52 engages the bolt to cause the pawl to be disengaged. The line of force is farther from the pivotal pawl when the pawl is in engagement with the tooth and adjustment is being made.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a drum, two brake shoes for cooperation with the drum, lever and linkage mechanism for actuating the shoes, means for adjusting the lever and linkage mechanism to take up the slack thereof as the brake shoes wear, a fluid motor for moving the lever and linkage mechanism and comprising a movable cylinder and a fixed piston, a source of fluid pressure connected to the cylinder, fluid pressure operated means for controlling the operation of the adjusting means, and means comprising valve means operable by a movement of the cylinder beyond a relative position with respect to the piston for placing the cylinder in communication with the fluid pressure operating means to thereby cause an adjustment of the adjusting means.

2. In braking apparatus, a drum, two brake shoes for cooperation with the drum, lever and linkage mechanism for actuating the shoes, means comprising a spring-controlled ratchet mechanism for adjusting the lever and linkage mechanism to take up the slack thereof as the brake shoes wear, a fluid motor for moving the lever and linkage mechanism and comprising a movable cylinder and a fixed piston, a source of fluid pressure connected to the cylinder, a fluid motor for controlling the operation of the ratchet mechanism, and means comprising valve means operable by a predetermined movement of the cylinder relatively to the piston for placing the cylinder in communication with the second fluid motor to thereby cause the ratchet mechanism to make an adjustment upon release of the fluid pressure from the source.

3. In an adjusting mechanism for a brake, a threaded rod, an internally threaded ratchet wheel engaging said rod, a casing surrounding said shaft and enclosing said wheel, a slotted plunger in said casing and provided with a retarding surface for contact with the periphery of the wheel, a spring acting on said plunger to bias said retarding surface toward the wheel, a pawl pivoted in the slot of said plunger and provided with a tooth for engagement with the wheel and with a tail piece, a removable stop carried by the casing and projecting into the slot, said stop being positioned to engage the tail piece to disengage the tooth from the wheel when the retarding surface is moved into contact with the wheel, and fluid-operated means for moving the plunger against the spring.

4. In an adjusting mechanism for a brake, a threaded rod, an internally threaded ratchet wheel engaging said rod, a casing surrounding said shaft and enclosing said wheel, a slotted plunger in said casing and provided with a retarding surface for contact with the periphery of the wheel, a spring acting on said plunger to bias said retarding surface toward the wheel, a pawl pivoted in the slot of said plunger and provided with a tooth for engagement with the wheel and with a tail piece, a removable stop carried by the casing and projecting into the slot, said stop being positioned to engage the tail piece to disengage the tooth from the wheel when the retarding surface is moved into contact with the wheel, a spring-biased bolt carried in said stop, said bolt acting on the pawl to move its tooth into engagement with the wheel when the tail piece is moved out of contact with the stop.

5. In braking apparatus, a drum, a base, a pair of brake levers pivoted to the base and each carrying a shoe cooperating with the drum, an actuating arm pivoted to one of the brake levers, adjusting mechanism positioned between said brake lever and the base, a main fluid-actuated motor acting between the arm and the base, a pivot pin carried by the arm, a link pivoted to the other brake lever and extending through the pivot pin, said link having a threaded end, a housing mounted on the pivot pin, an internally threaded ratchet wheel carried in the housing and engaging the threaded end of the link, an auxiliary motor carried by the pivot pin and actuating the ratchet wheel to vary the effective length of the link, and a connection between the main and auxiliary motors for supplying fluid to the latter when the actuating arm is moved more than a predetermined distance.

STEVE SCHNELL.